(12) United States Patent
Steiner (10) Patent No.: US 7,092,857 B1
(45) Date of Patent: Aug. 15, 2006

(54) NEURAL NETWORK FOR COMPUTER-AIDED KNOWLEDGE MANAGEMENT

(75) Inventor: Ralf Steiner, Buchs (CH)

(73) Assignee: IPCentury AG (DE)

( * ) Notice: Subject to any disclaimer, the term of this patent is extended or adjusted under 35 U.S.C. 154(b) by 0 days.

(21) Appl. No.: 09/979,684

(22) PCT Filed: May 24, 2000

(86) PCT No.: PCT/DE00/01669

§ 371 (c)(1),
(2), (4) Date: Nov. 20, 2001

(87) PCT Pub. No.: WO00/72256

PCT Pub. Date: Nov. 30, 2000

(30) Foreign Application Priority Data

| May 24, 1999 | (DE) | ............................... 199 23 622 |
| Aug. 31, 1999 | (EP) | ............................... 99116789 |
| Dec. 31, 1999 | (DE) | ............................... 199 64 094 |

(51) Int. Cl.
*G06F 17/10* (2006.01)
(52) U.S. Cl. ............................... 703/2; 706/50; 706/61
(58) Field of Classification Search .................. 703/22, 703/2; 706/12, 16, 45, 50, 61
See application file for complete search history.

(56) References Cited

U.S. PATENT DOCUMENTS

| 5,398,300 A | * | 3/1995 | Levey ........................ 706/16 |
| 5,659,666 A | | 8/1997 | Thaler ........................ 395/21 |
| 6,400,996 B1 | * | 6/2002 | Hoffberg et al. .............. 700/83 |
| 6,529,780 B1 | * | 3/2003 | Soergel et al. ................ 700/10 |
| 6,588,571 B1 | * | 7/2003 | Baudat ....................... 194/328 |

FOREIGN PATENT DOCUMENTS

EP 0 378 115 A2 7/1990

* cited by examiner

*Primary Examiner*—Albert W. Paladini
(74) *Attorney, Agent, or Firm*—Buchanan Ingersoll, LLP (57) ABSTRACT

The invention relates to a method and a neural network for computer-assisted knowledge management, based on a neural network (1) that is formed by a computer in its memory location. The invention method and neural network are especially for use in a decentralized, computer-assisted patent system that can be used via the Internet system, in the broad sense. The neural network (1) forms a system of artificial intelligence (KI), covering a fundamental knowledge base in the form of computer-readable texts. The neural network (1) consists of elements (2) that are associated with each other and weighted in relation to each other so that the sets of knowledge available can be managed and analyzed in relation to each other by computer means.

12 Claims, 5 Drawing Sheets

NEURAL NETWORK FOR COMPUTER-AIDED KNOWLEDGE MANAGEMENT

CROSS-REFERENCE TO RELATED APPLICATIONS

Not Applicable

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

The invention relates to a method and a neural network for computer-aided knowledge management, based on a neural network formed by a computer, in particular for use for decentralized computer-aided patent matters, which can be operated via the Internet, in the wider sense.

The neural network forms an artificial intelligence (AI) system since it extends over a fundamental knowledge base in the form of computer-legible data. The neural network is itself advantageously in the form of a specific type of vertically structured neural network similar to the harmony theory, in which each node or neuron, as an element in the network, has an associated significance. Each element is governed by a number of weighted conditions (references) to various hierarchically higher elements.

A further aspect of this invention is the support all users for patent matters and substantial documentation for the focusing, processing and priority-based protective-right storage of their development as an innovation.

In the way that the expression is used nowadays, knowledge management includes efficient administration of knowledge of all types in document management, starting from planning data, financial data, communication documents and publications in the form of text data to, later on, object-oriented technologies, including those in multimedia form. To this end, the knowledge is administered, classified on the basis of suitable common features, with the aim of reducing high redundancy from the start. Automatic classification systems generally require text-based documents in order to make it possible to use computer-aided text search machines, in general conventional text structurings for indexing, hierarchically classified Thesauruses and linguistic rules, to deduce their contents. The latter form the basis of the self-classifying Internet search engines which are now in normal use. The associations found between the various documents can be used as input data and training data for a neural network.

DESCRIPTION OF RELATED ART

Neural networks are already known as such, and especially for classification of knowledge, from IPC G06F15/18. The document DE 34111682C discloses a hierarchic associative data structure, preferably for storage of text, the document DE 4108310C2 discloses a processing system for a knowledge base in an expert system, in which the knowledge entered by a user is stored related to the level of the original relationship, and the expert system resulting from this is modified, and is thus maintained, with computer assistance by a knowledge engineer via a knowledge base processing system. The document DE 4124501C2 discloses an associative data structure in the form of a neural network and an associative method which, using metrics between input data, leads to unique classification. The document DE 440026111 discloses (specifically for understanding of written texts) an associative data structure which is in the form of an artificial neural network, and contains a large number of network nodes in successive layers, which contains specifically unweighted node inputs and whose nodes are subdivided into two types, thus resulting in a considerable reduction in redundancy.

The solution in the document U.S. Pat. No. 5,901,068 uses computer assistance to analyze patent specifications and other substantial documents, and uses semantic text analyses to produce therefrom the object solution approaches contained in them.

DE 19737939A1 discloses a self-convergent associative data structure in the form of a neural network for computer-aided administration of the developments which, together with the specific descriptions of the features which govern the knowledge set, as illustrations of means in effects and vice versa, form a Hilbert space. This associative data structure is suitable for the administration of all actually existing developments (referred to for short as developments in the following text), in particular including those for technical developments which are the subject matter of patent matters in the wider sense. The latter (referred for short as patent matters in the following text) should be regarded as meaning all knowledge management of technical developments, starting from the inventor and the decision authority responsible for a problem, via those service providers entrusted with the problem to the supreme institutions, whose activities are intended to be supported by computation in that particular field.

The identified knowledge set (referred for short as the knowledge set in the following text) that describes the real world is for these purposes governed by developments which hierarchically originate from one another in terms of sets. The knowledge management in this invention relates to such knowledge sets. DE 19737939A1 advantageously provides those skilled in the art with the fundamental understanding of the construction, functional principle and use of this invention.

BRIEF SUMMARY OF THE INVENTION

Briefly, the present invention relates to a method and a neural network for computer-assisted knowledge management, and is based on a neural network that is formed by a computer in its memory location. The inventive method and neural network are especially for use in a decentralized, computer-assisted patent system that can be used via the Internet system, in the broad sense. The neural network forms a system of artificial intelligence, covering a fundamental knowledge base in the form of computer-readable texts. The neural network consists of elements that are associated with each other and weighted in relation to each other so that the sets of knowledge available can be managed and analyzed in relation to each other by computer means. As a result of the special characteristics that they have as subsets defined by interaction pairs, the elements form a Hilbert space. A co-ordinates vector, advantageously chosen at the root element, is preferably allocated to each of the elements. The redundancy is reduced in the expert system formed by the neural network through the corresponding convergence characteristics of the associative data structure for a number of statistically independent entries, and the knowledge is classified.

One object of this invention, based on and as a development of the already known prior art, is to use computation to administer knowledge sets, and to analyze them with respect to one another. A further aspect of this invention is computer-aided focusing, processing and priority-based legal rights storage of a development as an innovation.

Advantageous refinements of the computer-aided neural network for computational implementation, specific analysis tools and methods, the dialog system for inputting and for outputting the knowledge sets and the storage of a development as an innovation are described in the developments.

The essence of the invention builds on the knowledge sets which originate hierarchically from one another and are associated with related developments, and which are advantageously formed as <quantity|quality> by suitable definition of subsets in the form of an interaction pair, with the related developments representing the elements of a neural network which, in conjunction with computationally declared new entries (addition) and weightings (multiplication) of these elements, form a Hilbert space. This implies that the description of real developments and of knowledge sets which describe them is based on the description of quantum-mechanical states. The knowledge set, which can thus be dealt with as a point set, forms a vector space and has particularly good convergence characteristics for computational use of the RITZ method. The convergence to the extreme which is provided statistically via the elements in the applications with respect to a mass determined by the neural network leads to an associative data structure of minimal redundancy.

Computationally, the neural network is implemented via a specific, dynamically administered, associative data structure in the memory of a computer, which necessitates the method which generates and administers this associative data structure being programmed very close to the system and, in particular, access to a linear memory area of sufficient size, the use and arithmetic of computer-specific pointers (referred to for short as pointers in the following text) to parts of this memory area, and a stack which is sufficiently large for recursions via the associative data structure. It is thus possible to use the inputting of the necessary elements, references, weightings etc. on a memory and computation-time optimized basis for incremental expansion of an associative data structure, whose memory space requirement rises only approximately linearly with the number of entries, and is preferably less than 1 kB per entry. It is thus possible to record and to administer the knowledge from a very wide knowledge field, for example technology, altogether in memory areas which can be addressed using 32 bits, or using 64 bits for very large knowledge fields, and which can be provided using extended commercially available servers. The associative data structure can be networked in a decentralized manner via networks. Every development of the associative data structure advantageously also includes a cross-reference to a tabular content database, for example for a link to a source document, from which the knowledge has been generated.

The user inputs and outputs to and from the neural network make use of an intuitive dialog system, to which the neural network contained in a server is connected via communication links for data, particularly advantageously including the Internet. The neural network is itself advantageously generated exclusively by inputting a standardized, strictly chronological stream, in that the interaction pair <quantity|quality> which is used for definition is directly suitable, or is stored indirectly via pointers, for each element, which is advantageously identified by an associated unique time index the stated references to other elements are stored and generated, and are advantageously cross-referenced via pointers backward in time, or else optionally additionally forward in time. Each newly entered element is weighted with an initially normalized weight. It is advantageous to use the time index for definition of an element and to sign the interaction pair and the stated references on a user-specific basis to prevent manipulation. All the necessary information for outputting can once again advantageously be transferred to the standardized, strictly chronological stream. This ensures the transmission on and the synchronization of a number of neural networks via communication links, with data security being ensured by encrypting the stream. In particular, half-mirrored neural networks can also read this stream to form their internal streams.

The development systems originate hierarchically from one another via oriented references from a root system by means of set operations (OR, AND, NOT), with the development system which identifies the development being defined via the subset of all the subsets <quantity|quality> of the reference systems, and the generic type being determined via a set relationship which contains this, for example via the subset of all the combination sets of quantity and quality or the subset of in each case one of these sets of all the reference systems. The interaction pair <quantity|quality> defines the development via the verbal definition, and hence defines precisely that knowledge set which maps the quantity onto the quality and, conversely, maps the quality onto the quantity, that is to say forms a subset within the cross-set of all quantities and all qualities. In the ideal limit case, this mapping process is mathematically unambiguous. This knowledge set, which is associated with the ideally defined feature, is necessarily a maximum since, otherwise, the quantities or qualities associated with that generic type would not all satisfy the above condition.

The neural network together with the elements for definition of knowledge sets is an associative data structure, which is formed by the inputting and modification of references between developments and is expanded incrementally, with the already entered developments being used in the backward direction to define further developments. The formation of a further development within the associative data structure corresponds to the addition of entered elements with a further element being newly entered which, with regard to the features is defined via the subset formation and, with regard to the weight, is defined via the normal addition of all the weights (in each case weighted by the references) of the reference elements. In a corresponding manner, this weight can be calculated recursively over all the references. The negative element in each case results with regard to an element from the associated exclusion features as a NOT element with a negative weight. The null element is the root element containing <all|nothing> with the weight 0. The status of a development is changed indirectly by a weighting of its references and corresponds to multiplication by a number which, with regard to the weighting of a reference, is defined as the normal and, with regard to the features of the reference development, is defined as the number of the subset formation with itself, advantageously based on the evaluation of an implementation probability for use of this reference for a specific development, with the implementation probability 0 being interpreted as being equal probability. Multiplication by one thus corresponds to multiplication by the identity, and multiplication by zero corresponds to the null element. Mapping of the real numbers for the weighting into the interval (−1, 1), with the significances: 1=undoubtedly used; −1 undoubtedly not used, is advantageous for evaluation as an implementation probability. The fractional component corresponds to an area implementation probability for a specific development.

The developments and the references or the reference developments are defined using a subset relationship in the form of an interaction pair in the form <quantity|quality> with respect to the significance content, with this being done verbally using terms which are optionally linked via AND, OR, NOT operators. The subset relationship for each element governs a development system <solution|object> for a development comprising a specific reference system or the combination of a number of reference systems <means|effect> as features. The elements contain or are linked to tabular databases, which contain the verbal definition, the index of the reference elements, the time index, the user index and, optionally, the short title, the short description and further details which cannot be changed but are associated with the elements.

The dialog system for the user is essentially used as the operating medium for inputs and outputs to and from the knowledge sets, using the verbal interaction pairs and the associative data structure resulting from the related developments, for analysis and administration in the neural network itself, essentially using the associated coordinates which are obtained by the references of the developments and from their weighting by the mapping of the dynamic associative data structure of the neural network in Hilbert space. Accordingly, the analysis and administration also takes account of knowledge sets which do not have any direct references to one another, provided their coordinates satisfy the analysis and administration conditions. It is thus possible to use computer assistance to administer and to analyze unambiguously and uniformly all the knowledge sets recorded by the neural network. Each knowledge set associated with a related development is characterized via its element of the neural network by one, and only one, coordinate vector, which is advantageously associated directly with it, or is linked to it, and is thus part of the element. The knowledge sets can be administered computationally by the neural network, in addition to the references to one another, via their coordinates as well and, in particular, these represent the basis for the mutual analyses. Conventional vector calculation methods are used as analysis methods (check for whether within a sphere, within a spatial angular range, projection onto specific vectors), which are based in particular on the calculation of a scalar product. The calculation of vectors and knowledge sets with specific characteristics is feasible, for example via the orthogonality, by means of the SCHMIDT method. Before the calculation, filters can optionally mask out or change the weightings of specific elements. In particular similar developments (spatial angles), obvious developments (spheres), major development items (concentrations), development free spaces (blank areas), development bypasses (orthogonalizations), trends (medium spatial angles of the subsequent developments of the spheres around concentrations) etc. are thus possible over the entirety of the knowledge base or over specifically filtered subsets, for example for competition analysis.

Each user who communicates with the neural network allocates, or fails to allocate, a specific development of this knowledge set on the basis of his personal knowledge and the statement or weighting of <quantity|quality>, or said user trying, at least unintentionally, to reach the extreme for a specific mass resulting from the application. These associations form the training input data for the neural network. They each have only a small information content, of course, and high mutual redundancy. For each input and weighting, the neural network is reformed dynamically with regard to its associative data structure. Via its large number of inputs from different users, the neural network thereby accumulates the described knowledge set statistically independently and "with reduced noise" in that a development which is repeatedly associated in the same way makes this specific in the necessary manner. Directed references to already entered reference developments are used to link the knowledge sets which define them to one another, and hence to limit the described knowledge sets for the development. Making the knowledge set of the reference developments specific thus also leads to the development knowledge set, which was initially limited only by the reference generic type, itself being made more specific.

Since a relatively ideal interaction pair necessarily has a larger area probability such that a specific development is contained within the subset instead of only within one of the sets forming it, this is given a higher weighting after accumulation. The more specifically a development is defined or a question is asked, the higher will be the weighting and the quality, or the validity, of the response statistically. High weightings correlate statistically with high absolute masses. Newly entered developments are necessarily located at the end of the associative data structure, and on the edge of a Hilbert space. The high weighting, which is advantageous for new entries or requests and is therefore statistically desired by the user, and which corresponds to a functional target function beyond one end of the associative data structure to the edge of a Hilbert space as the mass, statistically results in convergence to this extreme. Corresponding to the RITZ method, the associative data structure on which this is based converges, as such, to the necessarily existing ideal classification of the knowledge. This neural network is hence also suitable as a basis of an automatic classification system which is always matched dynamically to the knowledge state, in that this is generated from the main references of the network structure.

The details of reference restrict each defined interaction pair to the set of a respective reference system, which optionally also defines the generic type of the development. In this case, an ideal reference is equivalent to an ideal reference system, which is uniquely defined with all the interaction pairs, that is to say the quality is uniquely associated with the quantity, and vice versa. This does not normally occur with the references which actually occur in practice, but the probability that a specific implementation will make use of the knowledge set of the reference system with a given contained reference relating to all the references is a maximum for ideal references. In this sense, the associative data structure converges over the large number of inputs and weightings to the true situation, which is formed by ideal references and ideal systems and has no redundancy, without reaching it on each occasion. The references are advantageously weighted in normalized form and are provided with a status, which is optionally based in a fuzzy manner on probability details and optionally itself comprises a number of normalized references weighted on the basis of probabilities. Different types of weighting groups can thus be filtered, and can have their weightings changed.

The development and/or the element are/is advantageously provided with a short title. It is also advantageous to improve the legibility for the user for a brief description of the specifically intended development, contained in the knowledge set, to be added. It is likewise advantageous to define the terminology for new defining quantities or qualities on the basis of the quantities or qualities already known from stated references, for which purpose logical operators AND, OR, NOT can be used. In consequence, a Thesaurus for quantities and qualities is in each case generated automatically in addition by the neural network, which hierarchically structures these terms, and contains them weighted corresponding to the weight of the elements which use them. Furthermore, it is possible to search these descriptions and definitions, which represent the knowledge base of the neural network, for terms on a text-oriented basis in the normal manner and via linguistically worthwhile links in the context. For this purpose, a right-ordered and a left-ordered indexed list is in each case advantageously generated, with a cross-reference to the time index of the element or a pointer to it, which contains the reference. It is possible to take account of more than one language in the process. It is likewise feasible, based on an analysis of the syntax and sematics in the definitions of each interaction pair, linked to the two Thesauruses for the terms relating to the quantity and the quality, to transform these verbal definitions with a significantly high probability to mathematically logical terms of expressions which, in the end, are resolved computationally recursively via the reference elements, in order to obtain simplified definitions or to select contradictions. All the elements are advantageously stored dynamically, and are administered dynamically via a list that is concatenated via pointers. Each element has a uniquely associated NOT element, which is advantageously administered by a pointer to the same interaction pair. The NOT element annotates precisely that knowledge set which is excluded from the knowledge set of the associated element and which is required, for example, for forming elements with alternatives using the DE MORGAN formulae, or for exclusion elements. It is advantageous to generate the associated NOT element at the same time when generating an element. This can advantageously be distinguished from the associated element by means of a flag, for example the LSB of the time index.

The references themselves are advantageously generated via interval interleaving for determining that memory area of the reference element which is associated with the time index in the specific associative data structure, and for the single-ended or alternate concatenation of them via pointers. The forward and rearward references which are optionally associated with each individual element are themselves advantageously in turn administered via dynamic lists. The references themselves are in turn advantageously provided with dynamically stored weightings, which are in turn administered via dynamically concatenated lists. The weightings are advantageously user-specific, thus advantageously avoiding identical multiple weighting, and statistically dependent multiple weighting. In terms of memory, binary weighting can advantageously be achieved via the LSB of the unique user index. One possible assessment weight can optionally be determined and taken into account via the user index.

The time indices, which are associated with the input and weighting, provide unique allocatable associations between the user and an entry, allow manipulations (time concentrations) for weighting to be selected and suppressed (time inhibit), and the associative data structure can be provided with an evolutionary response via an advantageously exponential time decay function for the weightings. The coordinate vector for each element can be determined recursively via the vector addition of all the coordinate vectors (which are weighted with the respective weight) of the reference elements. However, for optimization of the computation time, it is advantageous to administer them in a temporary dynamic memory area, to whose start or end a coordinate pointer for the element cross-refers. For the coordinate vector, which is advantageously once again in the form of a dynamically concatenated list, it is once again advantageous in order to minimize the required memory space to only store the respectively required coordinates with, and organized on the basis of, their index. In accordance with the definition that is used and is implemented in the neural network for a metric, norm and scalar product—by way of example, the Euclidean for the n-dimensional space is suitable for this purpose, with each new development opening up a new dimension—these can be calculated easily, by computation, for the analysis and administration of important parameters. It is advantageous to store the norm of each element temporarily with it.

This neural network for knowledge management is contained, in particular, in a central server, which is available at no cost via the Internet to the majority of users or, optionally, is available, subject to a cost with the inclusion of a secure e-commerce system for information and financial services, and which takes care of corresponding actual entries or requests for knowledge. The chronological stream used for inputs is generated by the dialog system when a user is using the neural network in that this user defines, for example, knowledge sets to be entered by entering related developments, by asking the neural network questions related to developments, by indicating new references, or by carrying out weightings. Since the associative data structure is itself always being changed by the input chronological stream, it is advantageous to allocate the time index of their last calculation to all the optional temporary data areas of the various types of list elements. The recursive recalculation which becomes necessary when a change is made need be carried out only over those areas of the associative data structure which have actually been changed, thus minimizing the required calculation steps. To do this, the calculation time index is compared with the respectively associated time indices for these data areas. It is advantageous to exclude the use of temporary data areas for individual calculation time indices which differ from the current calculation time index, for example for specific calculations in the past, that is to say to calculate the entire associative data structure recursively.

The method is based on a large number of entries and weightings which are entered in the associative data structure of the neural network by a large number of users in the form of expansions and for training, and which thus modify them via such inputs. The neural network itself ensures the convergence of the associative data structure via the implemented operators, and carries out administration and analyses. This implies that the input stream, which is subject to "noise" due to irregular details, from different users is statistically compressed by the neural network with respect to the true situation for low redundancy and, in the end, an expert system is formed and the neural network carries out analyses of developments in the element Hilbert space, which are regarded as points and have coordinates. In a first step, the development is defined by references to one or more reference systems, which appear to the closest, via interaction pairs, and are entered by the neural network as an element in the development space. In a further step, a decision by a further user relating to the allocation of a new reference or the weighting via the actual correctness of the reference, the status of this reference is changed, and a further training input is thus produced for the neural network. In a further step, which includes a large number of the abovementioned steps by a large number of users relating to respectively associated developments, and which accordingly represents a large number of statistically independent input data items, the references of the associative data structure are successively adapted by the neural network, and the neural network is made dynamic, converging statistically to ideal references and thus forming an expert system with a reducing redundancy level. In a further step, operations on sets in the development space are carried out or monitored by the neural network for administration and analysis purposes, thus defining definition areas of the knowledge sets and calculating masses between individual developments. The masses are defined such that, in each particular application, they are subject to the reality of statistically necessary convergence to an extreme, on the basis of rules.

It is advantageous to inform the user, even during the verbal formulation, of the interaction pair of the entry and of the request with search results from the knowledge base relating to currently entered terms, to which the user will then possibly refer. In consequence, the associative data structure is always somewhat enlarged, and the neural network is trained. The latter is advantageously achieved via implicit positive weighting of the knowledge set of a given reference development, since a reference represents a subjectively positive weighting of the development described by the interaction pair. Furthermore, explicit weightings, preferably binary weightings, and the details of further references by third users are feasible, and are advantageous for the training of the neural network. With special authorization, for example on the basis of a qualification or higher jurisdiction in the form of a professor or examiner, a weighting can be produced with a higher assessment weighting that is specific to that examiner (for the rest of the examination). For optional manual examination of a development by a user, all the reference developments are advantageously checked to determine whether, on the basis of subjective evaluation by the examiner, the development is included in the individual knowledge sets of the reference developments, that is to say use is made of their teachings. The effect of the weightings for specific states, bureaus, examiners, users etc. may optionally be given different weightings retrospectively, via special filters.

Expanded analysis options are advantageous for service providers, and separate neural networks are advantageous for relatively large companies, with these neural networks being connected to the central neural network via a communication link, and optionally being half-mirrored. In addition to examination authorization, superior structures advantageously have specific systems which are matched to the respective specific knowledge field to describe the real world, for example for patent matters, macroeconomy, marketing and gene technology. In the advanced specific application of gene analysis, gene sequences are read together with the associated identified biofunctions, individual economies and associated activity fields are read for macroeconomy, and products and associated customer requirements are read for market analysis. The extreme function, which is required for convergence of these developments (which originate hierarchically from one another) in accordance with the RITZ method, as a mass, is provided as a rule for reality in a corresponding manner by the absolute "inventive step" which results via the intelligence of the inventor from people's inquisitiveness, by virtue of the biological evolution resulting from the driving force of nature in the fight to survive, from the efforts for financial wealth resulting from human commercial organization, and the demands of life resulting from human inactivity.

The stream which is used for inputting inputs of a user via a dialog system can alternatively, or advantageously additionally, also be generated in the preprocessing from content databases which contain, in concealed form, knowledge of related developments and which, due to their largely standard structuring and specific formulation of this knowledge with sufficient significance, make it possible to convert, via a computer-aided automatic projection, from their context to the stream format. Patent documentation in text format should be found to be particularly suitable, where particular importance is attached to the cited prior art, to the object and the idea of the invention and to the characterizing part of the patent claims with their typical formulations, and to their numerical association with, in particular, small reference numbers. It is advantageous to use the normal search options and the Thesaurus relating to the knowledge base of the neural network even during the preprocessing phase, in order to filter out the appropriately significant text items. The terminology in these text items should always be highly specific. It is likewise advantageous to provide such knowledge with a cross-reference to the content of a content database on which it is based, for example the patent number, and to note the recognized priority, which is particularly useful for analysis of patent matters. A further source for automatic generation of streams should be the patent classification and specialist dictionaries.

For use in patent matters, in which knowledge and developments are administered which are published in patents, utility models and technical documents or which optionally represent protective rights, the neural network at least provides assistance to computer-aided examination, official administration, monitoring, maintenance, searching or processing of the worldwide knowledge in a classification system and, as a specialist expert system, is superordinate to conventional tabular databases for patent matters, and is advantageously linked to them. To this end, the inventor, as the user, quotes references for definition of his development, which is defined as an interaction pair, and administers these references with computer assistance in the associative data structure, to which references task elements are associated, which the inventor defines finally or retrospectively from the pool of the original short description, which establish a reference system via an interaction pair and are used in the reverse direction for definition of further reference systems, with the protective area of the development system being determined from the subset of all the reference systems. In this case, the neural network automatically calculates an "inventive step" and a "novelty" between individual developments or all the entered developments via a function of the Hilbert space and the time indices, taking account of the status of each individual reference for this purpose. The associative data structure is incrementally expanded or modified by statements from third parties or official examination as an additional input for the neural network, with the development of the current state of knowledge leading to a reduction in redundancy with time in the examination of substance.

Particularly for applications in patent matters, it is advantageous, with regard to the problems relating to secrecy, to ensure appropriate encryption, identification of an authorized person and authentication of the inputs by implementing cryptological methods. The unique time index introduced for the entry and a unique user index advantageously mean that these two indices can be used to ensure the authenticity of the definition and of the references, and they are thus optionally encrypted. A laid-open period of grace could be ensured by means of a appropriate time filter for the output. The knowledge of a protective right or of a claim could be identified as a copy, with final references which cannot be changed, by means of a special flag. It is advantageous to subdivide the elements into documents and deeds, with the deeds being a copy of individual documents at a specific time, and the references of the deeds having a status which is constant over time, and the databases of the deeds optionally being linked to registers and/or having a unique cross-reference to content databases, with deeds which relate via references to other development systems optionally representing dependent deeds with the same priority as those deeds. Deeds accordingly participate only indirectly via the dynamics of their reference documents in the dynamics of the associative data structure, and they are frozen with regard to their references, as a result of which the currently defined associative data structure can be used, with the exclusion of any rearward analysis. With regard to such protective rights knowledge, a computationally defined substantial "novelty" with respect to the resultant logical term in the defined expressions in the totality of the significant references and a computationally defined substantial "inventive step" can optionally be calculated via functions such as the scalar product for a given time index with regard to the associative data structure, for example as an orthogonal separation from the trend of all the closest developments, without having to make any final statement with regard to these legal expressions. Furthermore, a cross-reference to the associated protective right or to the official register, with the legal state, would be worthwhile for protective rights knowledge.

In addition to the neural network comprising elements which are related to one another and are weighted, which neural network is stored dynamically in the liner memory area of a computer, dynamically as an associative data structure for computation purposes, with each element having an associated definition of a development as significance contents, which definition verbally defines the development, and hence the knowledge set, preferably in the form <quality|quantity> via a set relationship for an interaction pair, and these elements preferably form a Hilbert space, the element-by-element association of supplementary verbal text fields is advantageous, which briefly explain the significance content of the knowledge set for the above definition, and represent it in abbreviated form, like keywords.

These supplementary text fields are helpful even for the KI search of the associative data structure since, via the computer user interface, they assist the user to choose appropriately significant references for definition of the development to be searched, and which form the primary search question for the KI system. After each KI search, the neural network provides, in real time the associated obvious and similar developments and computationally estimates a fundamental novelty and inventive step. With regard to the development of an innovation, the user advantageously successively adapts the definition of the references of his development such that they result in as comprehensive a knowledge set as possible with as few references as possible, with the equally highly weighted inventive step and absolute novelty. The user thus focuses his innovation on a knowledge field which appears to be promising.

Since, as an element of the associative data structure, each development cross-refers via significantly weighted references to the abovementioned reference developments which define the individual features of the development, the definition structure of a development can be resolved recursively. Due to advantageous dynamics of the data structure, which converges by continuous use to a low redundancy level and hence to a higher truth content, this definition structure very largely follows the current already known knowledge state. The definitions of the first-order reference development (parents) should in general extend as an innovation to sufficient disclosure of the knowledge state used for a subsequent later user of the development, but the definition of the second-order reference development (grandparents) and further orders can also be used. The user is thus supported by an adequate disclosure content when working out a protective rights application.

The verbal definitions of the interaction pairs of the set relationship, preferably in the form of <means|effect>, in conjunction with the described text fields, which are shortened in the form of keywords, allows computer-aided generation of a protective rights application, with all the essential components such as the application with the designation of the applicant/inventor and of the address, description with short title, prior art, object, solution, exemplary embodiment as well as the claims and the abstract that is sometimes required, in conjunction with the, in principle, standard layout of a protective rights application and corresponding standard phrases, as well as details relating to the identification and the address of the user.

The grammar, which is faulty due to the computer-aided generation of the provisional application, is not a problem for filing of the substance of the innovation to justify priority. Such provisional application can be registered via modern telecommunications means such as FAX to justify priority, and if possible later, via data links, without delay with the appropriate protective rights filing offices. No signature is required for this purpose immediately but, if necessary, can be replaced by an electronic signature. No fees need be paid to justify the date of filing so that, if necessary, a subsequent application, corresponding to the normal practices, can be submitted within one year, claiming the priority of this provisional application. An optional publication period of grace for the development submission in the data structure of up to 18 months is provided for this purpose, and this is stored in a personally identified securely encrypted form for the user until this date.

Further advantageous developments of the invention comprise the embodiments of the text fields as:

KS: short title (of the development)

KB: short description (of the development) and the embodiment of the verbal definition of the set relationship for the knowledge set <solution|object> as:

KL: short solution (of the development)
LD: solution definition (of the solution)
KA: brief object (of the development)
AD: object definition (of the object)

This invention is advantageously integrated in a computer-aided knowledge management system, which is accessible via the Internet/Intranet, and which if necessary can be paid for via e-commerce, for searches and analyses in the substantial technical field, in particular for patent documents. The user with a mental implementation in the form of a specific development uses this knowledge management system in the following coarse steps:

- The user considers what object of the solution is associated with its implementation.
- The user enters a suitable brief title for the object and the solution.
- The user defines both brief titles using simple verbal sentence sequences.
- The knowledgement system for this purpose offers the user a choice of already known developments with expressions whose text matches being emphasized.
- If the implementation of the user is based on individual offered developments, this is used to define the expressions in the object and solution by marking a reference to them.
- In the previous step, the knowledge management system successively refines the choice, and the user refines the definition.
- The knowledge management system uses the KI search to determine the position of the development in knowledge space, and mathematically calculates exactly obvious and similar developments. The knowledge management system indicates to the user the relatively close development environment, makes it possible to move through these references and allows a complete indication of all the text fields, and optionally provides a link to the source documents of the respective developments, for example to patent documents.
- Using the calculation of absolute novelty and an inventive step, the user can estimate the innovation potential and, if necessary, can amend the development by means of a new definition.
- In addition to the above search, the user can optionally: enter the title and brief description of his submission as well as his personal identification and address in order to protect his copyright, and in order to allow a provisional protective rights application justifying priority. The knowledge management system enters this submission in an individually encrypted form in the database, although the submission will not be publicly available until a laid-open period of grace has elapsed. This is optionally followed by computer-aided generation of a provisional protective rights application, and its transmission without delay to the protective rights filing offices.
- The knowledge management system furthermore allows computer assistance for various analyses, which are normal in patent matters, of developments with respect to one another, in particular also assistance in protective rights infringement analyses relating to developments from legally valid protective rights.

The text fields are each configured as structures of fixed length for references B or the development E:

KS: short title (of the development), approximately 30 characters

KB: short description (of the development), approximately 300 characters

KL: short solution (of the development), approximately 30 characters

LD: solution definition (of the solution), approximately 150 characters

KA: short object (of the development), approximately 30 characters

AD: object definition (of the object), approximately 150 characters

In the end, the development E is formed, for example with three references B, by successive inputs by the user and by proposals from the knowledge management system, as well as KI searches building thereon, via: AND B1 OR B2 AND NOT B3, where B2 has a source document XXX.

The user also adds to this development his personal details NAME, ADDRESS and KS, KB with a publication period of grace of 18 months protected by personal encryption, into the data structure. The KI system uses mathematical algorithms to calculate and adequate inventive step and confirms the novelty, so that a protective rights application is recommended to the user, following the proposal. The computer then generates the subsequent provisional protective rights application and sends this via a communication link to a protective rights filing office, with the text modules being inserted IN ITALICS for clarity:

"Application for the grant of a patent

Applicant and sole inventor: NAME

Postal address: ADDRESS

KT

Generic type of the invention:
    The invention denotes a KT.

Prior art:
    KTB1 with KLB1, which is KAB1, is already known. KTB2 with KLB2, which KAB2 is already known from the document XXX, is also already known. KTB3 with KLB3, which KAB3, is also already known.

Object:
    According to the object, KTEKAE.KLE achieves this object according to the patent claim.

Solution:
    For this purpose, this is essentially a KTB1 with KLB1 which KAB1 OR is a KTB2 with KLB2 which is KAB2 AND NOT a KTB3 with KLB3, which KAB3 is configured as KLE, in that DLE results in this DAE.

Advantageous Embodiment:
    The KTE is advantageously configured as KLB1 in that DLB1 means that this DAB1.KBB1 OR the KTE is configured in that DLB2 results in this DAB2.KBB2 AND NOT the KTE being configured in that DLB3 results in this DAB3.KBB3. Thus KTEKAE.KBE.

Claim:
    KTE, which is conf igured as KLB1OR as KLB2 AND NOT as KLB3, characterized in that this is configured as KLE.

Abstract:
    The invention denotes a KTE. According to the object, KTEKAE.KBE.

Inventor Name:
    Title of the invention: KTE
    Inventor: NAME: ADDRESS
    The right to the protective right is transferred to the applicant by: the inventor is the applicant"

Such a provisional protective rights application justifies a date of filing whose priority can be claimed for a subsequent application corresponding to the normal practices. The successfully transmitted provisional protective rights application is issued as a real document, for example by being printed.

The following FIGS. 1–6 attempt to explain the invention without thereby restricting it or being able to and intending to refer to all the essential features specified in the description.

Figure 1:
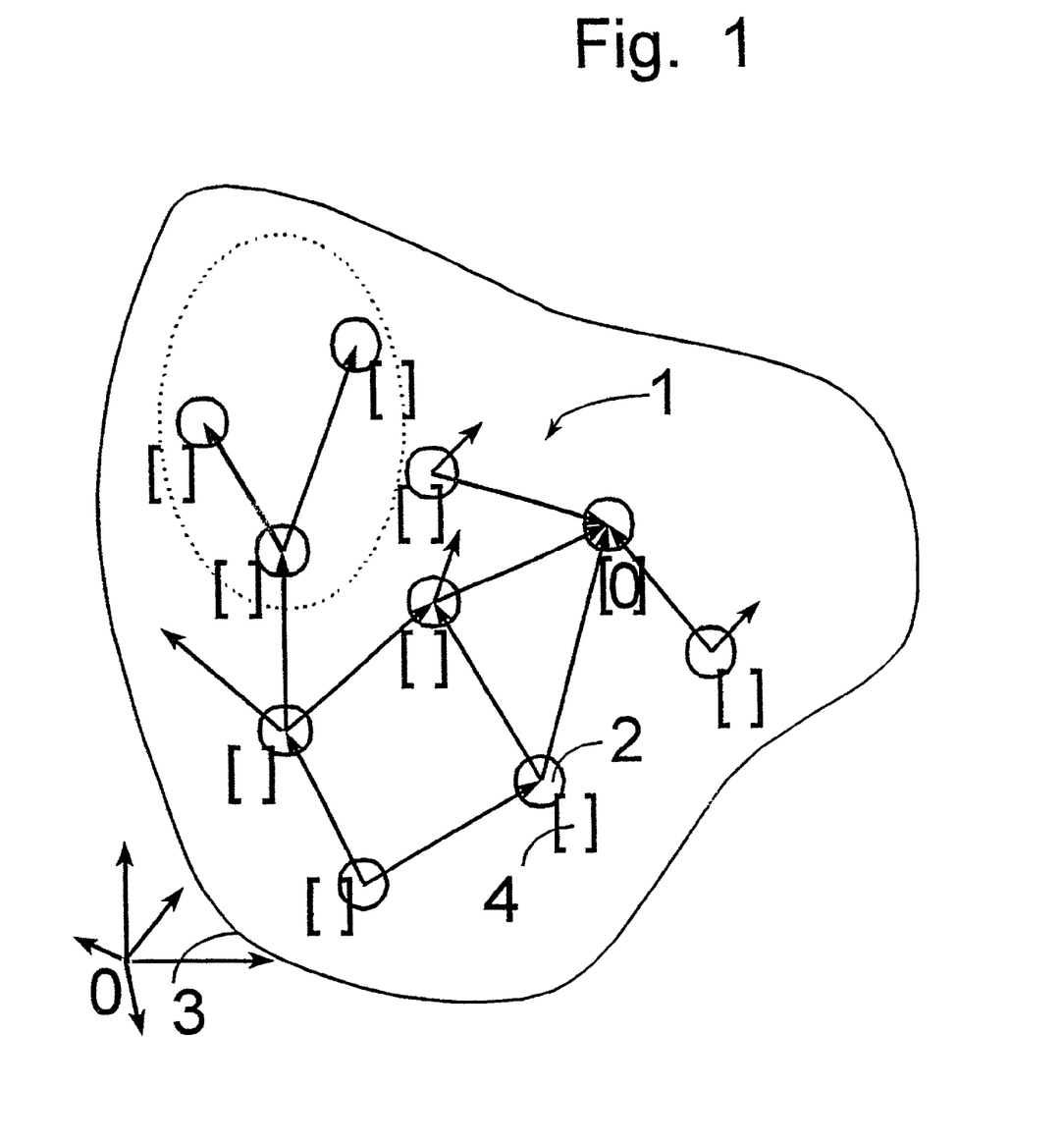
FIG. 1 shows a neural network for computer-aided knowledge management.

According to FIG. 1, a neural network 1 for computer-aided knowledge management comprises elements 2 which are related to one another and are weighted (normally referred to as neurons or nodes) which, by virtue of their specific characteristics, form a Hilbert space 3 and which preferably have an associated coordinate vector 4 which is advantageously chosen to be [0] for the root element.

Figure 2:
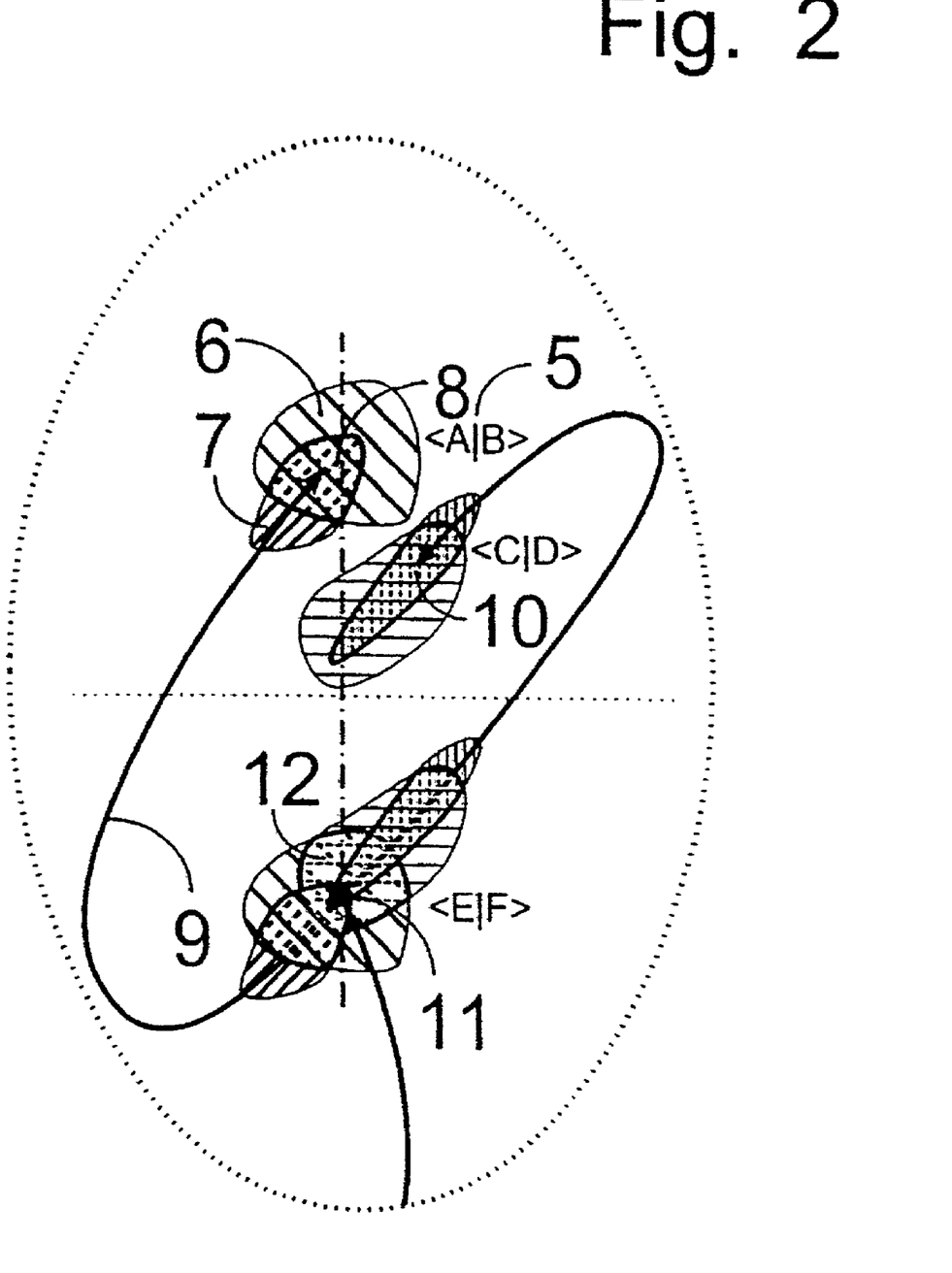
FIG. 2 shows an individual element of the corresponding detail in FIG. 1.

According to FIG. 2, each individual element 2 of the corresponding detail in FIG. 1 has an associated significance content which, as a specific form of the definition of the development, is in the form of an interaction pair 5, and preferably describes a quantity 6 and a quality 7 and hence, via its subset, defines precisely the knowledge set 8 which maps the quantity 6 onto the quality 7 and the quality 7 onto the quantity 6. These knowledge sets 8, 10 defined there are linked to one another via directional references 9 to already entered reference developments and hence bound the described knowledge set 11 of the development relating to it. Specific definition of the knowledge sets 8, 10 of the reference developments thus also leads to a specific definition of the knowledge set 11, which is initially bounded only by the reference generic type 12, of the development itself, relating thereto.

Figure 3:
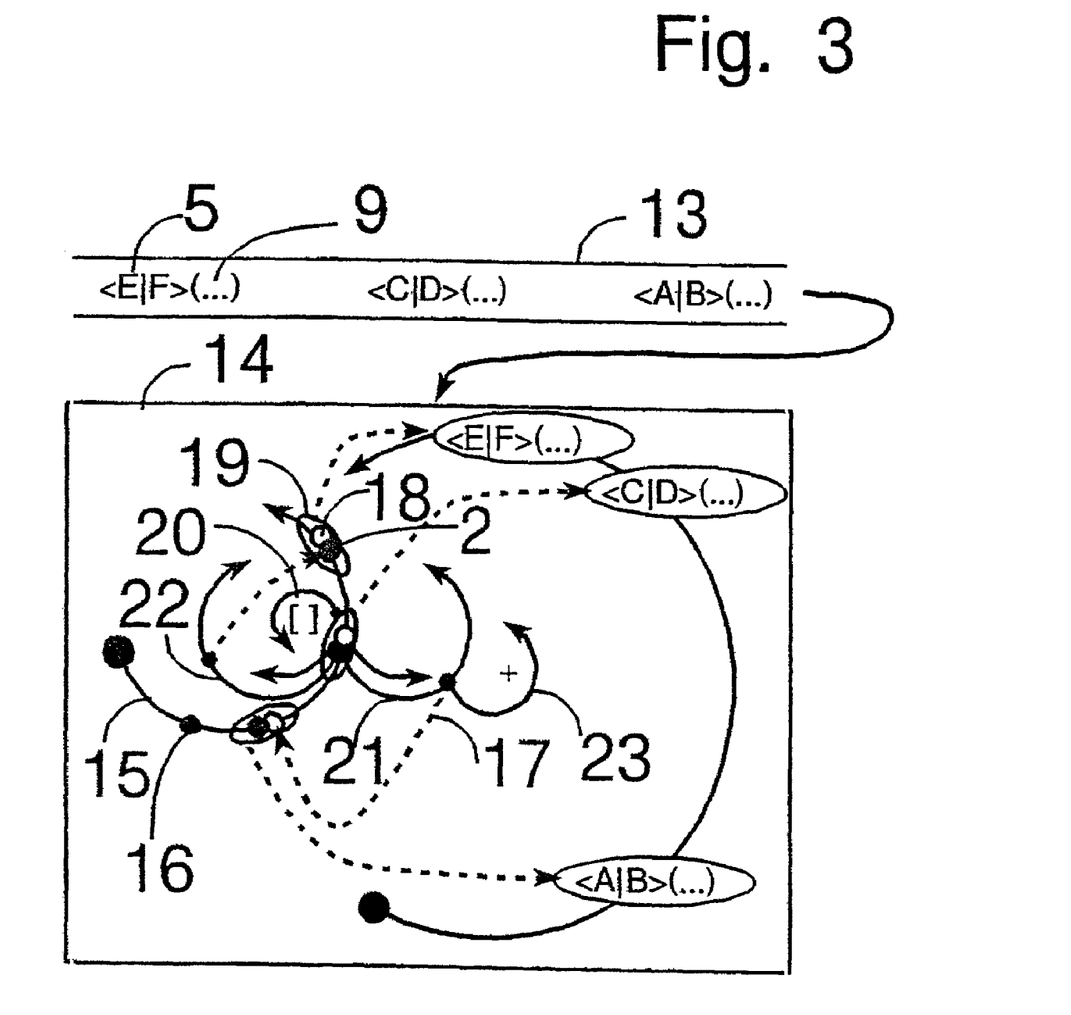
FIG. 3 shows a data stream.

According to FIG. 3, the stream 13 which is used for inputs is used in the form of a data stream which, strictly chronologically, includes the definition in the form of an interaction pair 5 and the references 9 to already entered elements 2, for incremental expansion of the neural network, in that new structural elements 16 are inserted into the associative data structure which is administered dynamically via concatenated lists 15 in the linear memory area 14 of the computer, and are linked via computer-specific pointers 17. An element 2 and a NOT element 18 advantageously form a pair 19, which points to the interaction pair 5 and advantageously includes a coordinate list 20, which includes the coordinates of the element 2 which correspond, in inverted form, to the coordinates of the NOT element. Each element 2 and each NOT element 18 advantageously has an associated back-reference list 21 and an associated forward-reference list 22, with the reference lists 21, 22 advantageously having associated weighting lists 23.

Figure 4:
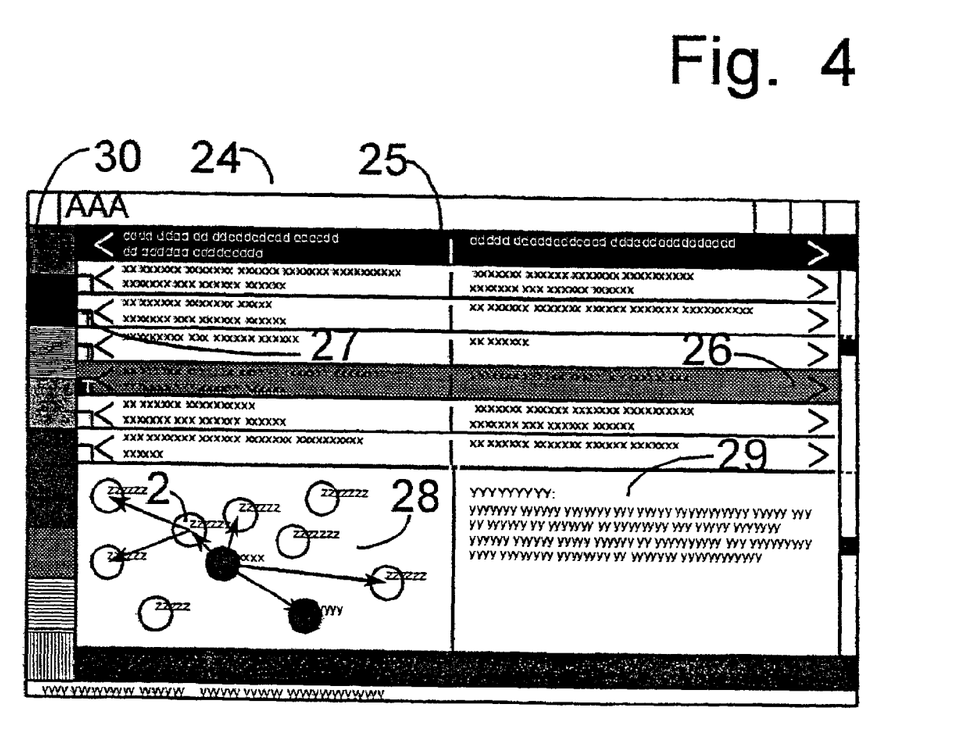
FIG. 4 shows a dialog system.

According to FIG. 4, a dialog system makes it possible, via an intuitive interface 24, to enter and to ask for developments relating to the definition 25 of the verbal interaction pair, and to state references. In this case, advantageously, the neural network virtually simultaneously offers a selection 26 of elements 2 of developments which are already included in the knowledge base, with similar expressions contained in the definitions 25, from which individual references to expressions that are used can be operated via a switch 27. Within the offered selection 26 of developments, one can in each case be marked, for which the local environment 28 of the directly connected elements 2 or of the close elements 2 of the associative data structure is indicated, advantageously graphically, displaying the interval between individual developments and their short titles. It is possible to move between the individual developments in the local environment 28 via submarking, with the definition 25 and the brief description 29 thereof being indicated. After the complete definition 25, the interaction pair and the references are signed, and are integrated via the stream into the associative data structure of the neural network. In further tools 30, the dialog system intuitively allows (in a similar or conventional manner) the inputting or outputting of a login, of a filter, of a text-based search, a recursive input of more general developments for advanced definition of terms, the input of additional references and of weightings, the output of structural data for the directly related developments that have been entered, in particular coordinate details for the element for feature analysis of the development, a statement of their associated mass, for example an "inventive step", calculated with the aid of scalar products, for the closest (sphere) development or most similar (spatial angle) entered developments, "specific definition level" determined with the aid of the norm, and "priority" thereof calculated with the aid of the time indices of identical terms from expressions having the same significance. A number of developments (suitably selected, filtered) are optionally taken into account in the analyses, in which case an analysis for a previous time is also possible, for which all the elements with more recent time indices are ignored and, in consequence, the associative data structure is represented in a previous structure.

Figure 5:
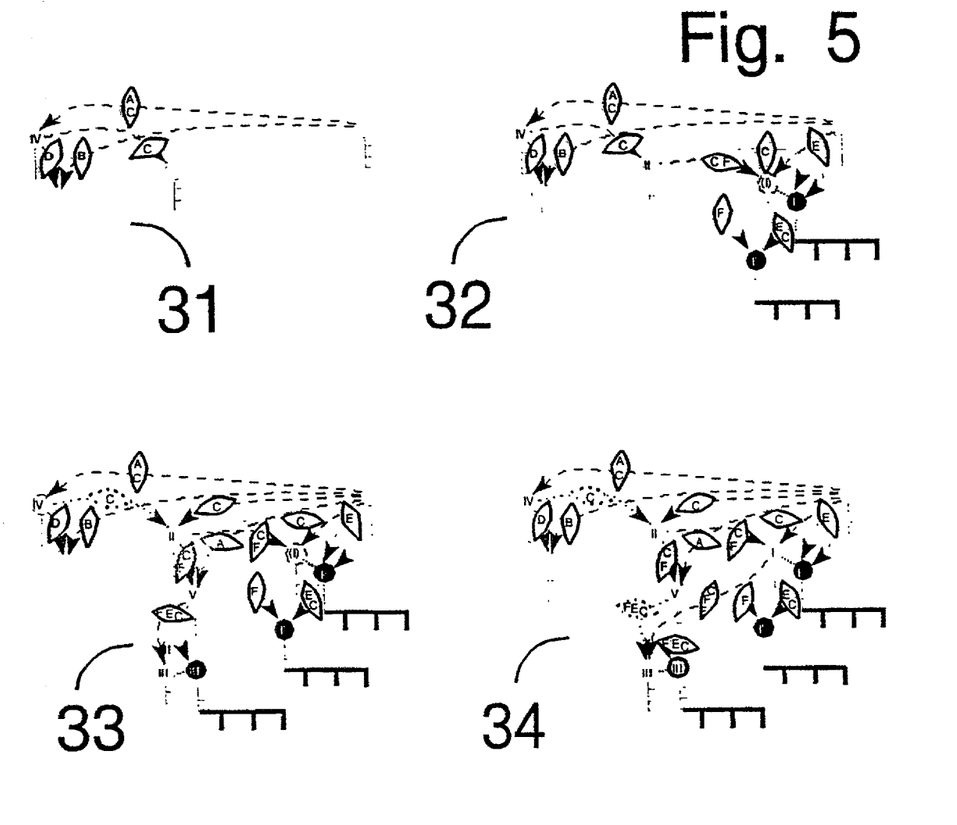
FIG. 5 describes the dynamic restructuring.

FIG. 5 describes the dynamic restructuring. The associative data structure comprises elements (in this case documents and deeds) which, originating from older documents, are structured with regard to references of features A, B, . . . and are weighted significantly for initialization T0 (31).

With regard to T1 (32), in order to enter a deed 1, a final reference C, which is required for this purpose, to the document II and the associated unpublished document (I) are entered. The deed I' represents a deed I' which is dependent on the deed I.

With regard to T2 (33), for example an older reference C than that of the reference document IV is significant for an equivalent feature C on the basis of the examination of a deed III, filed later, with respect to the document II, resulting in a reduction in the weighting of the old reference C and a changed associative data structure.

With regard to T3 (34), it can be seen on the basis of the publication of the document I that all the features C; E; F from the document III have already been completely anticipated by the document I, and a new significant reference C, E, F to the document I has been entered by user or an examiner. The deed III with the prior final reference C, E, F to the document V should thus be deleted, owing to lack of novelty.

Figure 6:
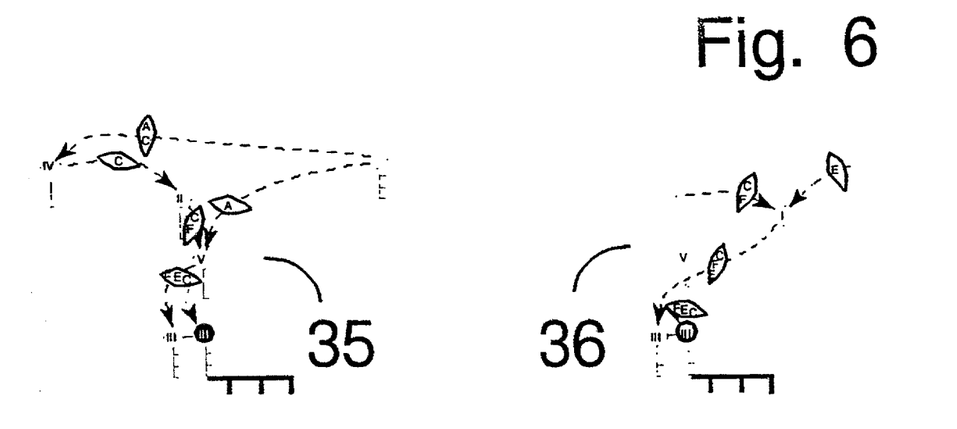
FIG. 6 describes analyses relating to patent matters.

FIG. 6 describes, specifically, analyses relating to patent matters: in order to determine the "inventive step" of the deed III, the branches of the individual features are weighted recursively with respect to the priority date (35) via their published documents II, IV, V which act as reference elements, on the basis of which a calculation can be carried out via the coordinates that are thus obtained. In order to determine the "novelty" of the deed III, a search is carried out with respect to the current time (36) in the associative data structure with regard to the associated document III for the priority of the totality of all the features of the fixed references C, E, F.

With the exemplary development E and the exemplary references B1 to B3, and their likewise exemplary text fields:

KTE: Non-rusting screw

KBE: A conventional steel screw does not form any rust if its surface is provided with an electrochemically applied coating of nickel KLE: Nickel bolt DLE: Electrochemically applied coating of nickel on a threaded screw KAE: Non-rusting DAE: Does not form any rust KTB1: Screw KBB1: A screw has a rotationally interlocking threaded pin KLB1: Threaded pin DLB1: Pin with external thread KAB1: Rotationally interlocking DAB1: Screwing movement is the only degree of freedom KTB2: Screw KBB2: The spiral cylinder of a screw can be screwed into an internal thread KLB2: Spiral cylinder DLB2: Cylindrical casing is formed like a spiral KAB2: Can be screwed in DAB2: Capability to rotate with axial translation XXX is entered as the source document KTB3: Drive screw KBB3: The rotation of a drive screw, as a propeller, causes fluid media to move KLB3: Propeller DLB3: Helical drive means for fluid media KAB3: Produces a flow DAB3: Rotation produces movement of a fluid the following provisional protective rights application is generated with computer assistance as an exemplary embodiment and is submitted by FAX to the Patent Office:

"Application for the grant of a patent

Applicant and sole inventor: Steiner, Ralf

Postal address: Balanstrasse 389: 81549 Munich; Germany

Non-rusting screw

Generic type of the invention:
   The invention refers to a non-rusting screw.

Prior art:
   A screw with a threaded pin which is rotationally interlocking is already known. A screw with a spiral cylinder which, as is already known from the document XXX can be screwed in, is also already known. A drive screw with a propeller which produces a flow is also already known.

Object:
   According to the object, the non-rusting screw does not rust. This object is achieved according to the protective claim by a nickel screw.

Solution:
   For this purpose, a screw with a threaded pin which is rotationally interlocking OR a screw with a spiral cylinder which can be screwed in AND NOT a drive screw with a propeller which, produces a flow is in the form of a nickel screw, in that electrochemically applied coating of nickel on a threaded screw means that this screw does not form any rust.

Advantageous embodiment:
   The non-rusting screw is advantageously in the form of a screw, in that a pin with an external thread results in this screwing movement being the sole degree of freedom. A screw has a rotationally interlocking threaded pin. OR the non-rusting screw is designed such that the cylindrical casing has a spiral form giving this the capability to rotate with axial translation. The spiral cylinder on a screw can be screwed into an internal thread. AND NOT the non-rusting screw is designed in a helical drive means for fluid media results in this rotation producing movement of a fluid. As a propeller, the rotation of a drive screw produces a movement of fluid media. This means that the non-rusting screw does not rust. A normal steel screw does not form any rust if its surface is provided with an electrochemically applied coating of nickel.

Claim:
   1. Non-rusting screw, which is in the form of a screw or a screw and not in the form of a drive screw, characterized in that this screw is in the form of a nickel screw.

Abstract:
   The invention relates to a non-rusting screw. According to the object, the non-rusting screw does not rust. A normal steel screw does not form any rust if its surface is provided with an electrochemically applied coating of nickel.

Details of the inventor:
   Title of the invention: non-rusting screw
   Inventor: Steiner, Ralf; Balanstrasse 389: 81549, Munich; Germany
   The right to the protective right is transferred to the applicant by: Inventor is the applicant"

REFERENCE SYMBOLS

1 Neural network
2 Elements
3 Hilbert space
4 Coordinate vector
5 Interaction pair
6 Quantity
7 Quality
8 Knowledge set of a reference development
9 Reference
10 Knowledge set of a further reference development
11 Knowledge set of the development
12 Reference generic type
13 Stream
14 Memory area
15 Concatenated list
16 Structural element
17 Computer-specific pointer
18 NOT element
19 Pair
20 Coordinate list
21 Back-reference list
22 Forward-reference list
23 Weighting list
24 Intuitive interface
25 Definition
26 Selection
27 Switch
28 Environment 29 Brief description
30 Tool
31 Time T0
32 Time T1
33 Time T2
34 Time T3
35 Priority time
36 Current time

What is claimed is:

1. A neural network for computer-aided knowledge management, with the neural network being composed of elements which are related to one another and are weighted, and which network is stored computationally as an associative data structure dynamically in the memory area of a computer, and the individual elements are allocated a significance content, characterized in that each element is allocated a definition of a development as the significance content, or directly contains this, in that this definition forms a subset in the form of an interaction pair which, optionally in the form<quantity|quality> via its verbal definition, defines the development and hence accurately defines the knowledge set, which maps the quantity onto the quality, and the quality onto the quantity, and in that the elements form a Hilbert space.

2. The neural network for computer-aided knowledge management as claimed in claim 1, characterized in that an operator is implemented for calculating a scalar product between each of the two elements, and is optionally in the form of the Euclidean for the n-dimensional space, in that an associated NOT element with a negative weighting for the element can be generated by the neural network for each element, which NOT element accurately denotes the knowledge set excluded from the knowledge set of the associated element, and is optionally generated as a pair with the element, in that a new entry of an element is implemented in the neural network as an addition, and a weighting of a reference is implemented as a multiplication in Hilbert space, and in that a mass can be calculated for each element by the neural network, and is optionally stored with it.

3. The neural network for computer-aided knowledge management as claimed in claim 1, characterized in that the element has one, and only one, associated coordinate vector, or directly contains this vector, which is optionally calculated via recursions in the neural network, in that the coordinate vector is optionally in the form of a dynamically concatenated list and optionally includes only the necessary coordinates organized with and on the basis of their time index, in that, when entered, each element optionally includes a unique time index and a unique user index, in that encryption, identification of the authorized user and authentication of the inputs are optionally ensured by implementing cryptological methods, with the authenticity of the definition and of the references optionally being ensured by means of the time index and the user index, and the definition and the references optionally being encrypted, in that the various types of list elements are optionally associated with the calculation time index of their last calculation via a temporary data area, with this calculation time index optionally being compared with the current calculation time index before carrying out the calculation, and in that each element optionally has a cross-reference to the associated entry in a content database, which is used as the basis for generating the knowledge.

4. The neural network for computer-aided knowledge management as claimed in claim 1, characterized in that the neural network is a component of a server, in that it is connected to a user via a dialog system, optionally via the internet and optionally with the inclusion of a secure e-commerce system, in that inputs for the neural network are optionally entered via a chronological stream, in that separate decentralized neural networks are optionally connected to the central neural network via a communication link and are optionally half-mirrored, and in that the dialog system optionally has an intuitive interface which, as an input for the neural network, allows a definition of the interaction pair, from a selection of references selected via switches, and optionally allows a short title and a short description and, as an output, allows the graphical display of a local environment of directly connected and/or unconnected elements in the associative data structure, and has further tools.

5. The neural network for computer-aided knowledge management as claimed in claim 1 characterized in that the neural network has specifically matched associated systems for applications in patent matters, macroeconomy, market analysis or gene analysis, in that, specifically for use in patent matters, a laid-open period of grace is optionally provided for the output via an appropriate time filter, the knowledge of a protective right is optionally identified as a copy with final references which cannot be varied, with definitions and with a particular flag, a computationally defined substantial novelty with regard to the totality of the significant references and a computationally defined substantial inventive step in comparison to the mass of data can optionally be calculated with respect to such protective rights knowledge, relating to a given time index, in comparison with the associative data structure, and a cross-reference is optionally included to the associated official register with the legal situation.

6. The neural network for computer-aided knowledge management as claimed in claim 1, characterized in that each of the individual elements has an associated supplementary verbal text field which briefly explains the significance content of the knowledge set for the above definition, or represented in abbreviated key word form, with the individual elements optionally having both explanatory and abbreviating associated text fields in the form of a short title and short description, and in that each part of the interaction pair is optionally subdivided into a short version and a definition and has an associated text field.

7. The neural network for computer-aided knowledge management as claimed in claim 1, characterized in that the neural network has associated means for telecopying and/or for long-distance transmission of text data, and in that means are optionally provided for supporting electronic signatures.

8. A method for a neural network for computer-aided knowledge management, characterized in that
an expanded input to the neural network is entered in one step, having optionally being converted in advance to a stream,
linking and incremental expansion of the associative data structure of the neural network relating to this input being carried out in a further step by access to a linear memory area of the computer, the use and arithmetic of computer-specific pointers to parts of this memory area and a stack which is sufficiently large for recursions over the entire associative data structure,
the weight of the elements being updated and/or calculated in a further step, with the new entry of an element corresponding to an addition and the weighting of a reference corresponding to a multiplication using the implemented operators for calculating the metrics, norm and scalar product in Hilbert space which is preferably in the form of the Euclidean for the n-dimensional space,
convergence of the associative data structure of the neural network for low redundancy is carried out statistically in an optionally large number of the preceding steps,
administration of and/or analysis between individual elements is carried out in a further step, using the operators for calculating the metrics, norm and scalar product in Hilbert space, via the calculation of masses by the neural network, and
the results of the administration or analysis are output in a final step.

9. The method for a neural network for computer-aided knowledge management as claimed in claim 8, characterized
in that all the elements are stored dynamically, and are administered dynamically via a list concatenated via pointers,
in that each element has a uniquely associated NOT element, which optionally has a pointer to the same interaction pair and is optionally generated with the generation of the element, with the NOT element optionally differing from the associated element in the LSB of the time index,
in that the generation of the references themselves is optionally carried out via interval interleaving to determine that memory area of the reference element which is associated with the time index in the specific associative data structure, and
in that this is optionally concatenated at one end or alternately via pointers, which are optionally administered via dynamic reference lists,
in that the references are themselves optionally provided with dynamically stored, optionally user-specific weightings, which are optionally formed via the LSB of the unique user index and which are optionally administered via dynamically concatenated weighting lists,
in that the operators for calculating the metrics, norm and scalar product in Hilbert space from the neural network are applied to recursively determined coordinates and/or to coordinate vectors of the elements, and the analyses are optionally based on vector calculation methods, and
in that a classification system is optionally generated by the neural network from the most significant references of the associative data structure and from the associated elements.

10. The method for a neural network for computer-aided knowledge management as claimed in claim 8, characterized in that, even while the definition of the interaction pair is being entered, a selection of elements is output from the neural network via the intuitive interface, which elements contain similar terms to those in the definition, with a reference (which is connected by the user) to an element optionally being used as a training input by the neural network,
in that new quantities, which define the described knowledge set, or qualities are optionally defined (in terms of the terminology) by the user on the basis of the quantities and qualities, respectively, which are already known by means of stated references, with AND, OR, NOT operators optionally being used, which are optionally transformed by the neural network, by means of analysis of the syntax and semantics, to mathematically logical terms of terminology and being solved recursively by computation via the reference elements, with the neural network in each case optionally using this to generate a respective Thesaurus for quantities and qualities, which contains these terms on a hierarchically structured basis and weighted in accordance with the weight of the elements which use them,
in that the user optionally adds to each element a specific development, which is contained in the described knowledge set, as a brief description and a brief title, in which case the brief descriptions and definitions can optionally be searched for terms in the normal manner on a text-oriented basis and/or via linguistically worthwhile links in the context, with the neural network optionally for this purpose generating in each case one right-ordered and left-ordered indexed list of the terms with a cross-reference to the time index of the element containing it, or a pointer to it being generated, and
in that the stream which is used for the input is optionally generated automatically during preprocessing from text-based contents of content databases, in that a computer-aided, automatic, compressed projection from the context of the content is produced into the format of the stream, with the search options and the Thesaurus for the knowledge base of the neural network optionally being used automatically during the preprocessing.

11. The method for a neural network for computer-aided knowledge management as claimed in claim 8, with the innovation being represented as a specific development relating to a computer-aided knowledge management system via verbal definitions and references to other already known developments, characterized in that
the innovation is focused successively by the user, with regard to high innovation potential, in an optional first method step relating to the novelty and inventive step calculated by the knowledge management system and output to the user,
in a further method step, the user enters the details of the identity and address of the user and all the text fields,
in a further method step, the development is entered into the knowledge management system as an innovation, with this development optionally not being accessible during a publication period of grace by being securely encrypted on a user-specific basis,
in an optional further method step, a provisional protective rights application is generated with computer assistance using standard phrases, and
in an optional final method step, these are transferred without delay to a protective rights receiving point, with this application optionally being signed with an electronic signature.

12. Use of the neural network for computer-aided knowledge management as claimed in claim 1, characterized in that, for patent matters, it is used as an expert system for substantial decisions, for administration or for analyses, with the interaction pair being formed between solutions and tasks or means and effects in the technical field, or in that it is used in the macroeconomy as an expert system for financial decisions, for administration or for analyses, with the interaction pair being formed between individual economies which can be separated financially and activity fields, or in that it is used in marketing as an expert system for marketing decisions, for administration or for analyses, with the interaction pair being formed between products and customer requirements, or in that it is used in gene technology as an expert system for DNA sequencing, for administration or for analyses, with the interaction pair being formed between gene sequences and biofunctions, or in that it is formed in the innovation requirement for protective rights application by innovative developments at protective rights receiving points.

* * * * *